United States Patent
Rhodes, Jr.

[11] Patent Number: 5,460,402
[45] Date of Patent: Oct. 24, 1995

[54] AIR BAG COVER DOOR HAVING A PREDETERMINED OPENING CHARACTERISTIC

[75] Inventor: Richard D. Rhodes, Jr., Somersworth, N.H.

[73] Assignee: Davidson Textron Inc., Dover, N.H.

[21] Appl. No.: 380,016

[22] Filed: Jan. 27, 1995

[51] Int. Cl.⁶ .................................................. B60R 21/16
[52] U.S. Cl. .................. 280/728.3; 280/732; 280/731
[58] Field of Search ................................ 280/732, 728.3, 280/728.2, 728.1, 731

[56] References Cited

U.S. PATENT DOCUMENTS

| | | | |
|---|---|---|---|
| 3,708,179 | 1/1973 | Hulten | 280/150 |
| 4,893,833 | 1/1990 | DiSalvo et al. | 280/732 |
| 4,895,389 | 1/1990 | Pack, Jr. | 280/732 |
| 4,964,653 | 10/1990 | Parker | 280/732 |
| 5,062,662 | 11/1991 | Cameron | 280/733 |
| 5,066,037 | 11/1991 | Castrigno et al. | 280/728 B X |
| 5,116,077 | 5/1992 | Rhodes, Jr. | 280/728 B X |
| 5,154,444 | 10/1992 | Nelson | 280/732 |
| 5,161,819 | 11/1992 | Rhodes, Jr. | 280/732 |
| 5,195,776 | 3/1993 | Sakakida et al. | 280/732 |
| 5,335,936 | 8/1994 | Faigle et al. | 280/728 B X |
| 5,335,937 | 8/1994 | Uphues et al. | 280/728 B |

FOREIGN PATENT DOCUMENTS 4221248 8/1992 Japan .................................. 280/728 B

*Primary Examiner*—Margaret A. Focarino
*Assistant Examiner*—Christopher Ellis
*Attorney, Agent, or Firm*—Reising, Ethington, Barnard & Perry

[57] ABSTRACT

An air bag cover door assembly utilizes a releasable fastener along each side of the air bag cover door to provide a predetermined opening characteristic for the cover door. The fasteners can be hook and loop tape, mechanical interlocks, adhesive strips, etc., with one half of each fastener secured to the inside surface of the cover door and the other half secured to a substructure, such as a dashboard pad retainer, in mating engagement with the first half. The fasteners are located along the sides of the cover door proximate the hinging axis of the cover door so that expansion of the air bag causes the cover door to initially hinge along a line extending between the engaged fasteners and then causes the fasteners to separate, allowing the cover door to swing open fully about its hinging axis. This reduces the speed of the cover door as it fully opens, thereby directing the air bag rearwardly toward the occupant and reducing the possibility of windshield breakage when the cover door assembly is used in a passenger side, top mount position of an automobile.

9 Claims, 4 Drawing Sheets

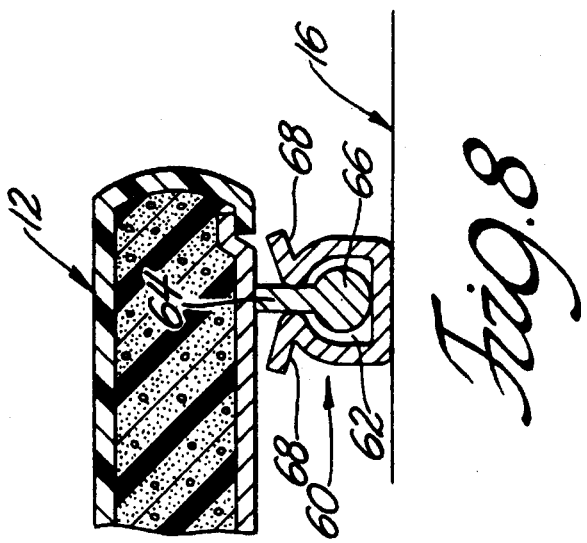
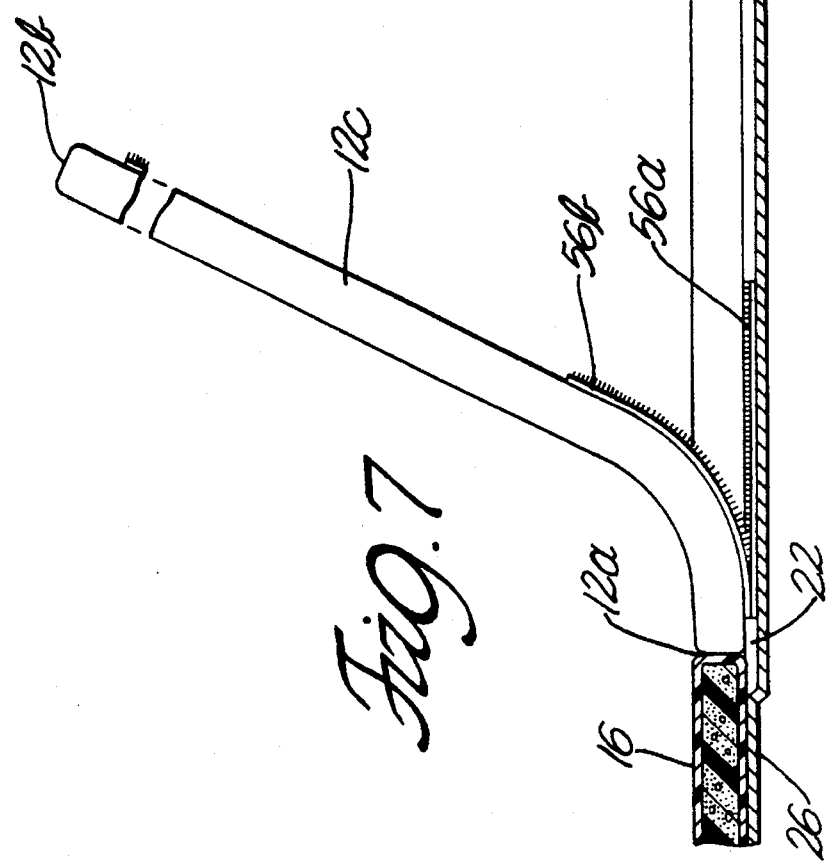

5,460,402

AIR BAG COVER DOOR HAVING A PREDETERMINED OPENING CHARACTERISTIC

TECHNICAL FIELD

This invention relates to cover doors for automotive air bag restraint systems and, more particularly, to an arrangement for providing the cover door with a predetermined opening characteristic upon inflation of an air bag located behind the cover door.

BACKGROUND OF THE INVENTION

Air bag restraint systems are used in vehicles such as automobiles to help reduce the extent of personal injuries incurred in vehicular accidents. Air bags are designed to inflate during a collision to restrain movement of the driver and/or other occupants to help avoid injurious contact with interior portions of the automobile. They are typically stowed behind a cover door in one or more interior trim structures, such as the steering wheel cover, door panel, or dashboard. The cover door is attached to, or formed as part of, the interior trim structure in such a manner as to inhibit access through the door opening from outside the door (e.g., by an occupant of the vehicle), and to open under the force of an expanding air bag to permit the air bag to expand out through the opening and into the interior of the vehicle.

Common deployment locations within an automobile for air bag restraint systems include, for the driver, the center hub of the steering wheel and, for a front seat passenger, either the top (horizontal) or rear-facing (vertical) surface of the dashboard. Other deployment locations include door panels, seats, and headliners. Cover doors for air bag deployment openings that are located in a generally horizontal opening in the dashboard are referred to as top mount cover doors and cover doors for deployment openings located in a generally vertical opening in the dashboard are referred to as mid-mount doors. Examples of top mount air bag cover doors are disclosed in U.S. Pat. Nos. 4,893,833 to A. J. DiSalvo et al., 4,964,653 to K. L. Parker, and 5,154,444 to E. S. Nelson. Examples of mid-mount doors are disclosed in U.S. Pat. Nos. 3,708,179 to R. E. Hulten and 4,895,389 to W. D. Pack, Jr.

As shown in the patents to DiSalvo et al. and Parker, top mount cover doors are commonly designed to pivot along a front edge of the door so that the door swings upwardly and toward the automobile's windshield. As the air bag inflates it moves upwards through the door opening and rearwardly towards the front passenger seat. A duality of problems can arise from this arrangement. First, the forceful opening of the air bag cover door by the inflating air bag causes the door to swing open with sufficient force and speed that the cover door can contact and even break the automobile's windshield. Second, since the deployment opening is located in a generally horizontal orientation, the air bag must first move upwards as it exits through the door opening, even though the desired direction of inflation is rearward toward the front passenger seat.

Cover doors for front passenger restraint systems are typically secured along an edge of the cover door, either by a releasable fastener or otherwise. It is known to use hook and loop tape as a releasable fastener to maintain the cover door closed until deployment of the underlying air bag. See, e.g., U.S. Pat. No. 5,161,819 issued Nov. 10, 1992 to R. D. Rhodes, Jr. Although suitable for maintaining a tamper-resistant closure of the cover door, the arrangement disclosed in that patent only restricts the opening of the door initially—it does not limit the speed of the cover door as it swings open. Rather, once the hook and loop tape separates, the door is free to swing open with as much force as is imparted to it by the expanding air bag.

SUMMARY OF THE INVENTION

The present invention provides an air bag cover door assembly that opens upon inflation of an underlying air bag in a desirable and predetermined manner. The assembly includes an interior trim structure having an air bag deployment opening and an air bag cover door in the opening that is pivotally attached to the interior trim structure along a first edge of the cover door. The cover door has opposed second and third edges that extend away from the first edge and that are releasably attached to the interior trim structure proximate the first edge. The cover door can be held closed at a section of the cover door located remotely from the first edge in a conventional manner.

The cover door can be releasably fastened to the interior trim product using any of a number of fastening schemes, including hook and loop tape, pin and knob fasteners, releasable adhesives, or mechanical interlocks. The releasable fastener provides resistance to complete opening of the cover door, giving the cover door a predetermined opening characteristic in which preparation of a portion of the cover door from the interior trim structure is hindered. Consequently, when the cover door opens, it initially hinges about a line extending generally between the releasable fasteners at the second and third edges. As the air bag continues to expand through the deployment opening, the fasteners separate with some of the force imparted by the expanding air bag to the cover door being used to provide the force needed for this separation. As a result, the speed (and, thus, momentum) of the cover door is reduced as it swings open. This arrangement is particularly advantageous when utilized in a top mount location of a vehicle dashboard because it helps direct the air bag rearwardly toward the front passenger seat and it limits the speed of the cover door to reduce and/or eliminate the incidence of windshield breakage. Other predetermined opening characteristics can be provided by changing, for example, the location of the fasteners and/or the separation force of the fasteners.

BRIEF DESCRIPTION OF THE DRAWINGS

A preferred exemplary embodiment of the present invention will hereinafter be described in conjunction with the appended drawings, wherein like designations denote like elements, and:

FIG. 7 is a cross-sectional view taken along the 7—7 line of FIG. 6; and

FIG. 8 is an enlarged, cross-sectional view showing a mechanical interlock that can be used as a releasable fastener with the embodiment of FIG. 6.

DESCRIPTION OF THE PREFERRED EMBODIMENT

Figure 1:
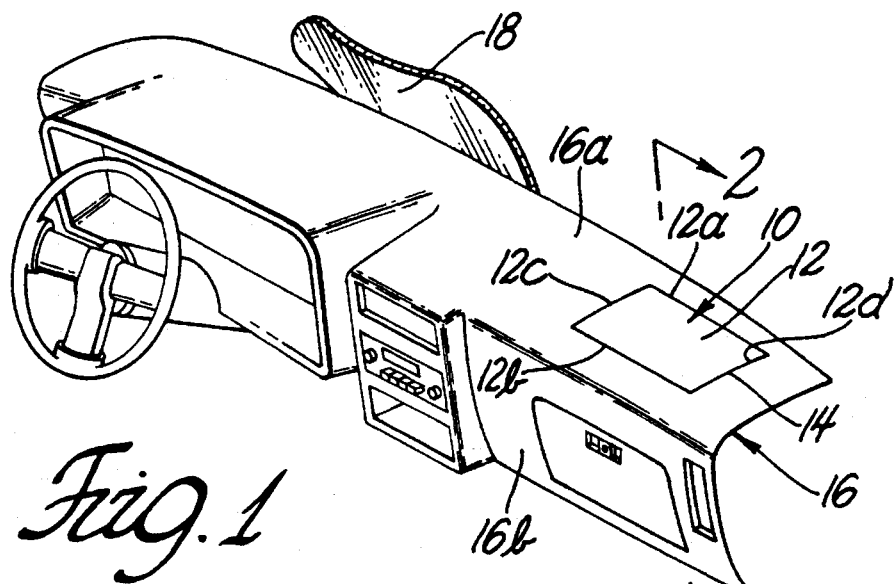
FIG. 1 is a perspective view of an automobile dashboard incorporating a preferred embodiment of the air bag cover door assembly of the invention.

Referring to FIG. 1, an air bag cover door assembly 10 for an automobile air bag restraint system is shown. Cover door assembly 10 includes a closure panel or cover door 12 that fits within an air bag deployment opening 14 that is located in a top (horizontal) surface 16a of an automobile dashboard or instrument panel 16. Deployment opening 14 has a rectangular shape and cover door 12 has a corresponding shape that closely conforms to the rectangular shape of opening 14. In particular, cover door 12 has a front edge 12a located proximate a front windshield 18, a rear edge 12b located proximate rear surface 16b of dashboard 16, and a pair of opposed side edges 12c and 12d that extend between front edge 12a and rear edge 12b. As will be described in greater detail below, cover door 12 is pivotally mounted along its front edge 12a so that expansion of an underlying air bag causes cover door 12 to swing upwardly about front edge 12a to permit deployment of the air bag through opening 14.

As will be appreciated from the preceding paragraph, the adjectives used to indicate spatial relationships (e.g., top, horizontal, rear, front) indicate spatial relationships as they exist when the components of cover door assembly 10 are located in their intended orientation with the automobile. Thus, for example, rear edge 12b is so named because it is the edge of cover door 12 that is closest to the rear of the automobile when cover door 12 is installed in the automobile in its intended orientation. This convention is utilized throughout the specification and claims. Also, although cover door assembly 10 is shown being located in a top mount position, it will of course be appreciated that the deployment opening could be located on rear surface 16b of dashboard 16 or at another location, depending upon the desired location of the air bag unit. Moreover, other tear seam configurations could be used, such as an H-shaped tear seam, which could be formed from two U-shaped doors.

In accordance with the present invention, cover door 12 is releasably fastened to a substructure of dashboard 16 in such a manner as to provide a predetermined opening characteristic; specifically, an opening characteristic in which separation of the front section of the cover door (i.e., the section of cover door 12 proximate edge 12a) from the substructure is hindered. This resistance to separation can be provided by a releasable fastener, such as hook and loop tape, connecting the cover door and substructure along sides 12c and 12d proximate side 12a. This results in some of the force imparted by the expanding air bag to the cover door being used to overcome the resistance of the cover door from further pivoting once it has partially opened, thereby reducing the speed (and, thus, momentum) of the cover door as it swings upwardly and towards the windshield. This construction also helps direct the air bag rearwardly toward the front passenger seat, rather than upwardly toward the roof. This feature of the invention is described in greater detail below.

Figure 2A:
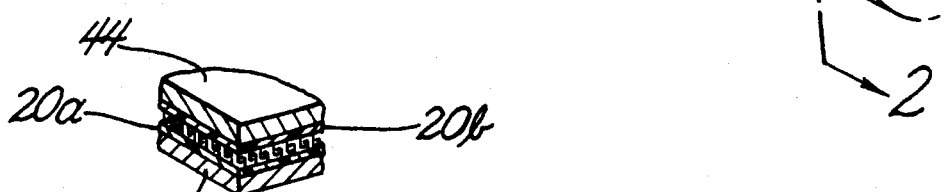
FIG. 2A is an enlarged fragmentary perspective view showing a hook and loop fastener used in connection with the embodiment of FIG. 2.
Figure 2:
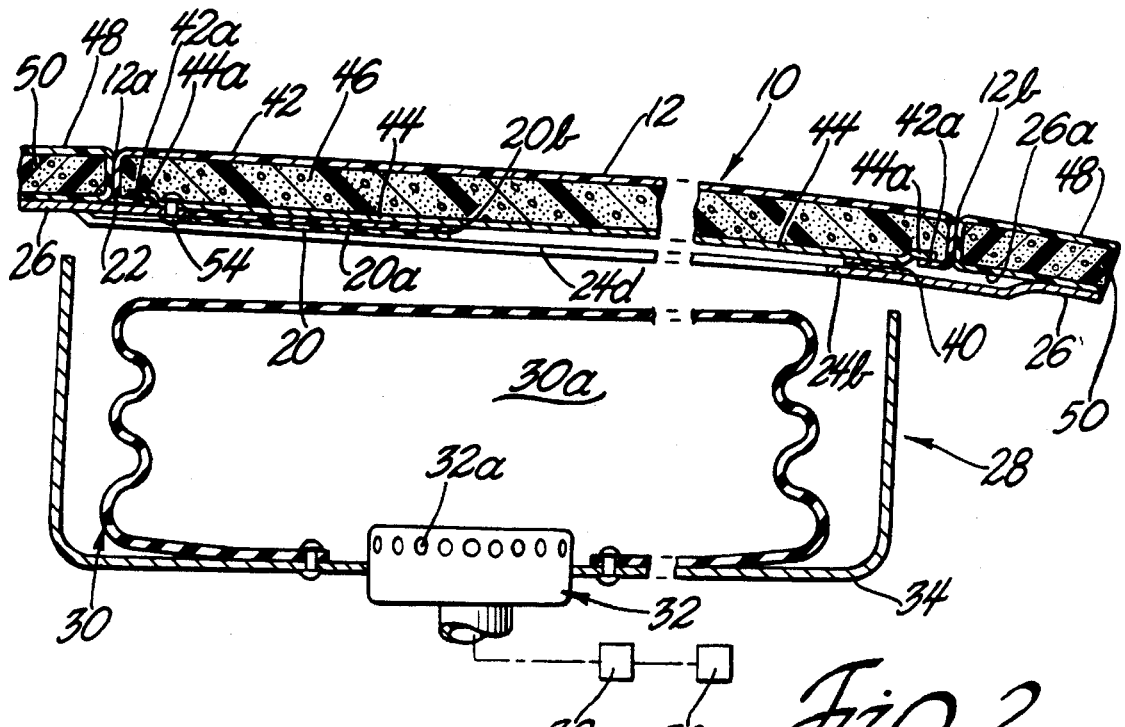
FIG. 2 is a cross-sectional view taken along the 2—2 line of FIG. 1.
Figure 3:
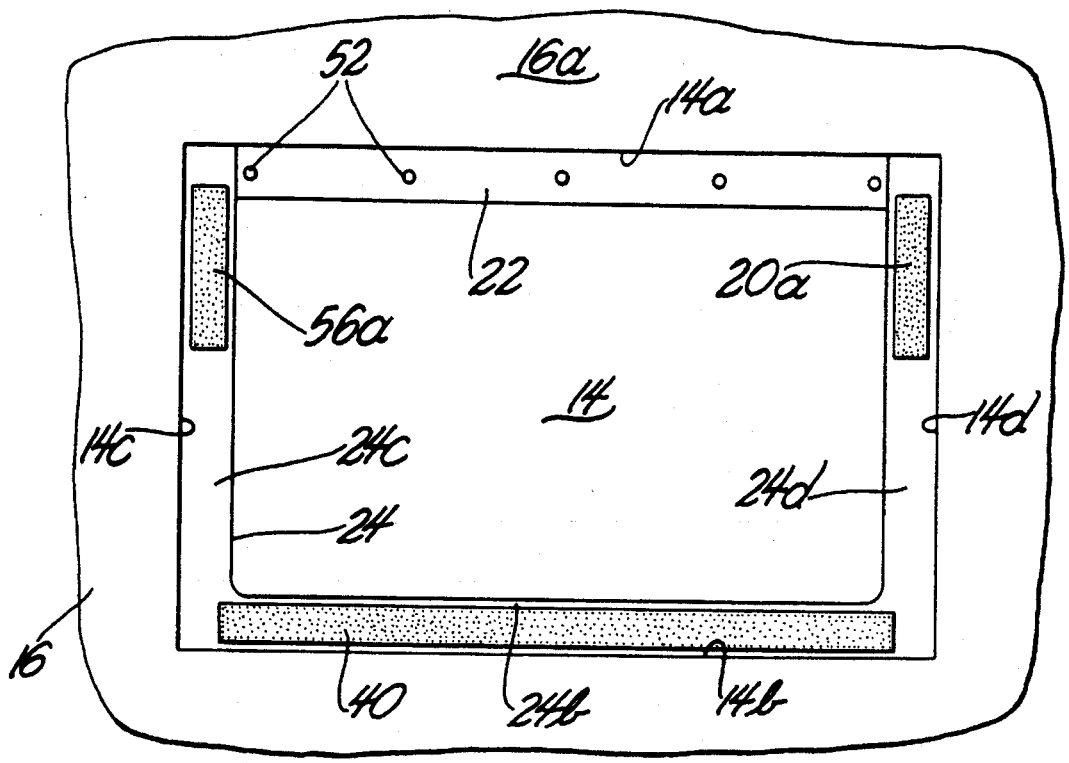
FIG. 3 is a top view of the cover door assembly of FIG. 1 with the air bag cover door removed.

Referring now to FIGS. 2 and 3, the details of construction and operation of cover door assembly 10 will now be described. As shown in FIG. 2, cover door assembly 10 includes cover door 12, hook and loop fastener 20, a hinge or tether 22, and a substructure, such as a recessed rim 24 of a pad retainer 26 of dashboard 16. Below cover door 12 is an air bag unit 28, comprising an uninflated air bag 30 and a gas generator 32 located in a casing 34 that is mounted underneath dashboard 16 in a conventional manner. Gas generator 32 has a plurality of openings 32a through which a suitable gas is expelled to inflate air bag 30. Vehicle impact is detected by an impact sensor 36 which signals a controller 38 to initiate gas generation, as is well known to those skilled in the art. Air bag 30 is connected about generator 32 to casing 34 so that the gas flows from generator 32 into the interior 30a of air bag 30, resulting in expansion of air bag 30. Casing 34 includes rigid sidewalls which insure that expansion of air bag 30 will be through opening 14 rather than into other areas underlying dashboard 16. Cover door 12 is secured within opening 14 at rear edge 12b by a releasable fastener 40 that separates under the pressure exerted by the expanding air bag. Preferably, fastener comprises a hook and loop tape closure arrangement (one half of which is shown in FIG. 3) constructed according to the teachings of U.S. Pat. No. 5,161,819, issued Nov. 10, 1992 to R. D. Rhodes, Jr., the disclosure of which is hereby incorporated by reference. Any other suitable arrangement for securing cover door 12 in a closed position can be used without departing from the scope of the present invention.

Cover door 12 is a composite article having a vinyl outer skin 42, a rigid insert 44, and an intermediate foam layer 46. Outer skin 42 and insert 44 are typically pre-formed and can thereafter be made integral with foam layer 46 in various ways that are known to those skilled in the art. In the illustrated embodiment, outer skin 42 has edge portions 42a that are formed over peripheral edges 44a of insert 44 with foam layer 46 located therebetween. Outer skin 42 can be a polyvinyl chloride, such as plastisol or drysol, a thermoplastic urethane, or an acrylonitrile-butadiene-styrene (ABS) resin and can be formed by processes such as those disclosed in U.S. Pat. Nos. 4,664,864, issued May 12, 1987 to J. M. Wersoskey, and 4,784,911, issued Nov. 15, 1988 to J. C. Gembinski et al. Insert 44 can be preformed as described, for example, in U.S. Pat. No. 4,734,230, issued Mar. 29, 1988 to R. D. Rhodes, Jr. et al. The preformed outer skin 42 and insert 44 can then be placed on opposing inner surfaces of a mold and bonded together by the formation of foam layer 46 therebetween. Such a process is described in U.S. Pat. No. 4,743,188, issued May 10, 1988 to J. D. Gray et al. The disclosures of the patents referenced in this paragraph are hereby incorporated by reference.

Dashboard 16 has a construction that is similar to cover door 12. It has an outer skin 48 surrounding a foam layer 50. Outer skin 48 is attached at its lower surface 48a to pad retainer 26 which provides structural integrity to dashboard 16. Cover door 12 and dashboard 16 are matched in terms of color, aesthetic detailing, and resiliency so as to minimize the effect of cover door 12 on the aesthetic quality of the automobile's interior.

Cover door 12 is secured within opening 14 to hinge 22 and recessed rim 24. As best seen in FIG. 3, rim 24 partially circumscribes deployment opening 14. It includes a rear section 24b extending along rear edge 14b of opening 14 and opposed side sections 24c and 24d that extend along respective edges 14c and 14d of opening 14. Hinge 22 is a co-planar extension of pad retainer 26 that is located along front edge 14a of opening 14. It includes a plurality of spaced apertures 52 by which it is secured to cover door 12 using rivets 54.

Fastener 20 comprises two complementary components—hook tape 20a and loop tape 20b. Hook tape 20a is adhered or otherwise secured to section 24d of rim 24 at a location proximate front edge 14a of opening 14. Similarly, loop tape 20b is adhered or otherwise secured to the surface of insert 44 along a portion of edge 12d of cover door 12 so as to mate with hook tape 20a. A second fastener 56 releasably fastens cover door 12 to pad retainer 26 along a portion of side 12c of cover door 12 that is proximate front edge 12a of cover door 12. Fastener 56 comprises hook tape 56a attached to section 24c of rim 24 and loop tape 56b (not shown) attached to insert 44 along edge 12c of cover door 12. Hook and loop tape fasteners 20 and 56 can be, for example, that sold under the trademark Velcro by Velcro U.S.A., Inc. of Manchester, N. H. If desired, an adhesive can be added between the hook tape and loop tape of fasteners 20 and 56 to further strengthen the adhesion of these tapes together.

It will of course be appreciated that other means of providing a predetermined opening characteristic could be utilized. For example, hinge 22 could be constructed so as to resist pivoting of cover door 12 to thereby direct the air bag rearwardly and slow the speed of the cover door. As another example, cover door 12 could include a metal retainer that is hinged or preweakened along a plurality of spaced lines running across the cover door parallel to front edge 12a so that cover door 12 "rolls" or "curls" as it is forced open upon deployment of the air bag.

Figure 4:
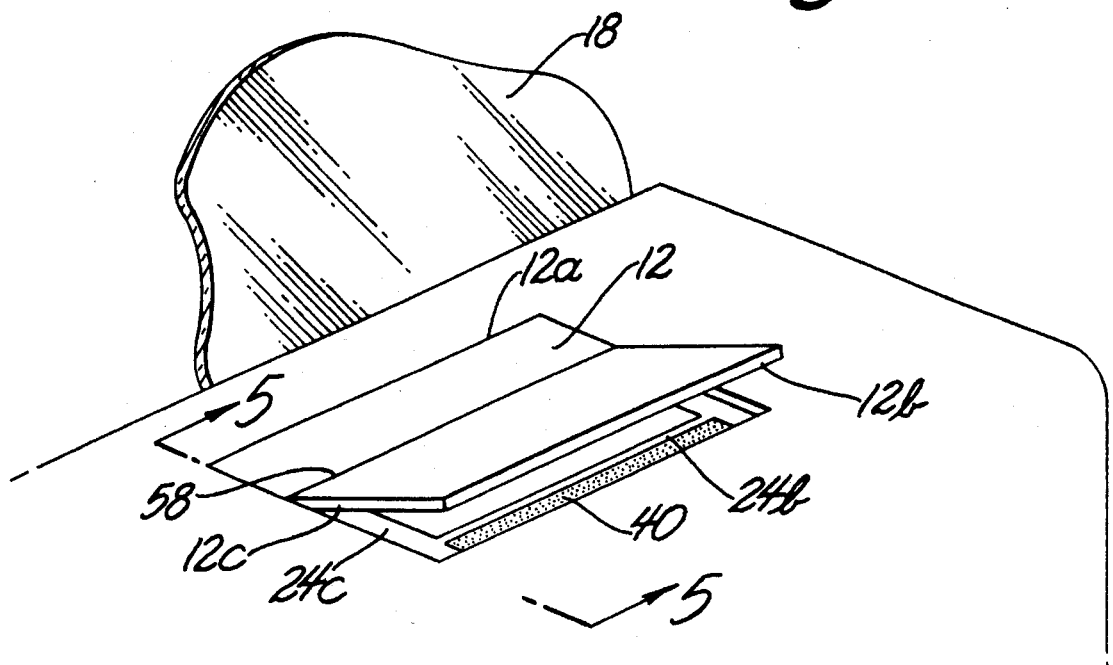
FIG. 4 is a perspective view showing the initial opening of the air bag cover door of FIG. 1.
Figure 5:
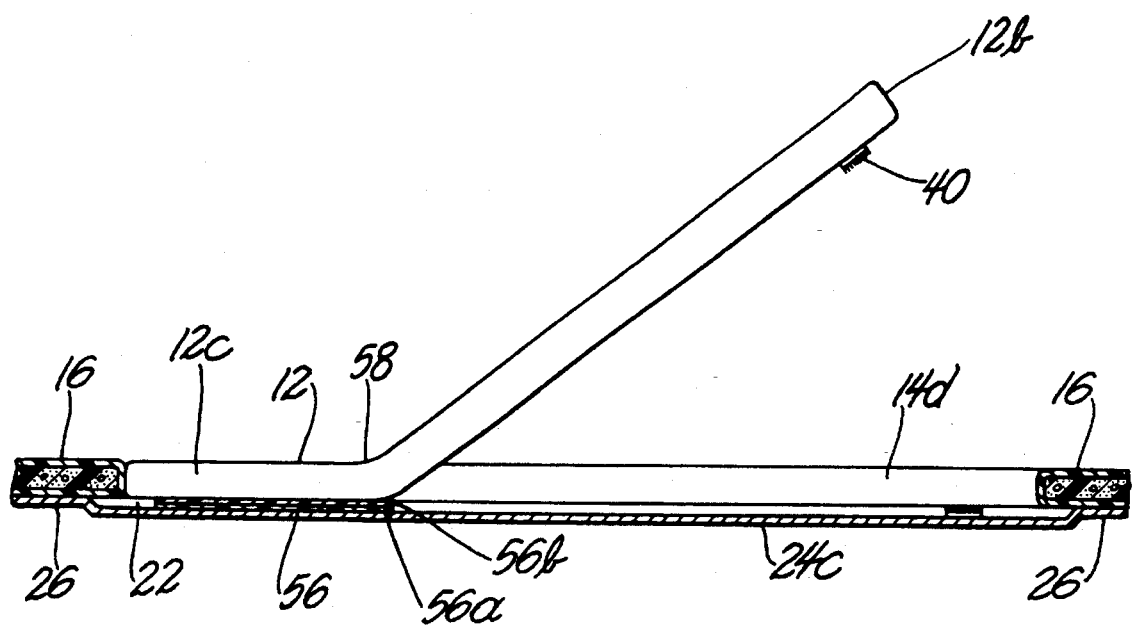
FIG. 5 is a cross-sectional view taken along the 5—5 line of FIG. 4.
Figure 6:
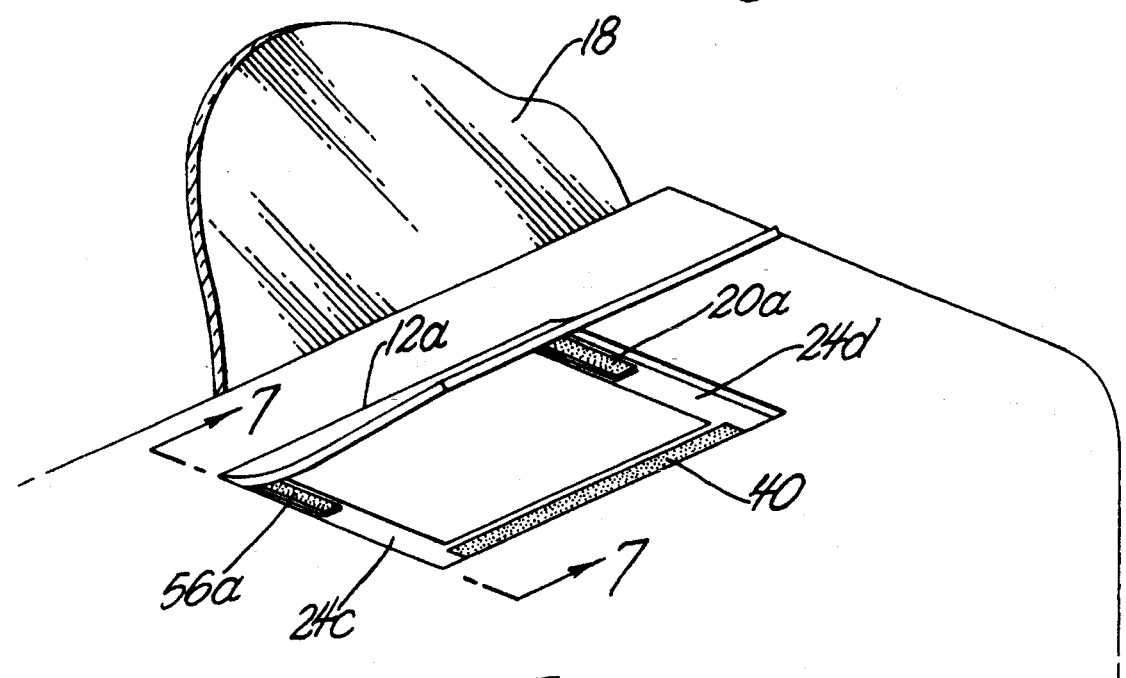
FIG. 6 is a perspective view showing the air bag cover door of FIG. 1 near its fully opened position.

Referring now to FIGS. 4–7, the opening characteristic of cover door 12 will be described. As shown in FIGS. 4 and 5, expansion of air bag 30 (not shown) initially causes fastener 40 to separate and rear edge 12b of cover door 12 to pivot upwardly about a line 58 extending generally between the rear-most edges of fasteners 20 and 56. This helps direct the expanding air bag rearward towards the front passenger seat. As the force of the expanding air bag increases, fasteners 20 and 56 begin to separate at their rear-most edges. This separation of cover door 12 from rim 24 is achieved using some of the force imparted to cover door 12 from the expanding air bag, resulting in the speed at which cover door 12 swings open being less than it would be otherwise. As shown in FIGS. 6 and 7, progression of the separation of fasteners 20 and 56 is forwardly toward edge 12a of cover door 12. The air bag continues to expand through opening 14 until fully deployed, by which time cover door 12 has fully opened with fasteners 20 and 56 having completely separated.

As will be appreciated, the opening resistance provided by fasteners 20 and 56 not only helps direct the air bag toward the front passenger seat, but also limits the speed of cover door 12 so as to reduce and/or eliminate the incidence of windshield breakage. The hinging of cover door 12 along line 58 may also help limit the speed of cover door 12. The stiffness of cover door 12 is selected in relation to the holding force of fasteners 20 and 56 such that the cover door initially hinges along line 58. Cover door 12 (e.g., insert 44) can be preweakened along line 58 if desired to aid in this intermediate hinging action.

As will be appreciated by the foregoing discussion of the operation of cover door assembly 10, fasteners 20 and 56 together comprise a means for limiting the speed of cover door 12 as it opens in response to air bag 30 being deployed through opening 14. It will of course be appreciated that other means could be used for limiting the speed of the cover door as it is forced open by expansion of air bag 30. For example, other tear apart fastening arrangements could be used, such as tear apart fasteners using a pin and knob interface, or an adhesive that bonds cover door 12 to instrument panel 16 along all or part of sides 12c and 12d and that is selected so that the force exerted by the expanding air bag is sufficient to overcome the adhesive bond. Optionally, a mechanical interlock 60 such as that shown in FIG. 8 could be used. Mechanical interlock 60 includes a metal channel 62 that is secured to instrument panel 16 and that runs along one of the side edges of cover door 12. A metal tab 64 having an expanded head portion 66 is secured to cover door 12 along the same side edge. Head portion 66 runs along and is captured within channel 62 by a pair of ears 68 that extend along the length of channel 62. Upward force on cover door 12 by an inflating air bag causes ears 68 to be pressed outwardly as head portion 66 is pulled out of channel 62. Other such variations will become apparent to those skilled in the art.

Of course, the substructure to which cover door 12 is connected need not necessarily be a part of dashboard 16. Rather, it could be a part of air bag unit 28. For example, rim 24 and/or hinge 22 could be formed as part of casing 34 so that the dashboard does not form a part of the air bag cover door assembly. Optionally, the cover door, or portions thereof, could be formed as a unitary part of the dashboard, as in U.S. Ser. No. 07/985,916, assigned to the assignee of this application and hereby incorporated by reference. For example, a pair of doors that open along an "H" shaped line could be used, with outer skin 42 of cover door 12 and outer skin 48 of dashboard 16 being formed as a unitary article. In this embodiment, a predetermined door opening characteristic can be implemented by providing a tear seam only running along the common boundary of the two doors. Then, upon deployment of the air bag, the outer skin will separate readily along this tear seam, but the necessary tearing of the outer skin along the opposing sides of the two doors will be through the full thickness and strength of the outer skin and will operate to limit the speed of the doors as they open.

It will thus be apparent that there has been provided in accordance with the present invention an air bag cover door assembly which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, rather than fasteners 20 and 56 providing opening resistance at the front section of cover door 12, the opening resistance could be distributed only at the initial opening of the cover door (i.e., near its rear edge) or throughout the opening of the cover door, depending upon the opening characteristic desired for a particular application. All such variations and modifications are intended to come within the scope of the appended claims.

I claim:

1. An air bag cover door assembly for covering an air bag deployment opening in a vehicle interior trim structure, comprising:

an interior trim structure having an air bag deployment opening; and an air bag cover door pivotally attached to said interior trim structure along a first edge of said cover door and having second and third edges that extend away from said first edge, said cover door having a shape that corresponds to said opening in said interior trim structure and being secured in said opening at a section of said cover door located remotely of said first edge to thereby restrict said cover door from pivotal movement about said first edge to thereby restrict said cover door from pivotal movement about said first edge until deployment of an air bag through said opening;

said cover door being releasably attached to said interior trim structure along predetermined portions only of said second and third edges adjacent said first edge with the remaining portion of said second and third edges adjacent a fourth edge of said door opposite said first edge being unattached to said trim structure providing relatively less resistance to separating of said door from said trim structure than said predetermined releasably attached portions of said second and third edge in response to deployment of an air bag through said opening.

2. An air bag cover door assembly as defined in claim 1, wherein said cover door is attached to said interior trim structure along said portions by a releasable fastener.

3. An air bag cover door assembly as defined in claim 2, wherein said releasable fastener comprises one half of a hook and loop fastener secured to said cover door and another half of said hook and loop fastener secured to said interior trim structure in mating engagement with said one half of said hook and loop fastener.

4. An air bag assembly as defined in claim 2, wherein said releasable fastener comprises a mechanical interlock.

5. An air bag cover door assembly as defined in claim 1, wherein said interior trim structure comprises an automobile dashboard with said opening being generally rectangular and being located in a horizontally disposed region of said dashboard;

wherein said cover door is generally rectangular in shape and is secured in said dashboard such that said first edge of said cover door is located along a forward edge of said opening.

6. An air bag cover door assembly as defined in claim 1, wherein said cover door is constructed so as to hinge along a line extending between said second and third edges at the juncture between said predetermined portion and said remaining portion of said second and third edges during separation of said remaining portion from said trim structure.

7. An air bag cover door assembly as defined in claim 1, wherein said interior trim structure includes a retainer underlying an outer surface of said interior trim structure;

wherein said cover door is pivotally connected to said retainer by at least one hinge; and wherein said cover door is releasably attached to said retainer along said portions of said second and third edges.

8. An air bag cover door assembly for covering an air bag deployment opening in a vehicle interior trim structure, said assembly comprising:

an interior trim structure having an air bag deployment opening provided therein;

an air bag cover door accommodated within said deployment opening having a front edge, a rear edge spaced from said front edge, and a pair of opposite side edges extending transversely between said front and rear edges, each of said side edges having a front section adjacent said front edge of said door and corresponding rear section adjacent said rear edge of said door;

a hinge connection pivotally securing said front edge of said door to said trim structure;

a first releasable tear away fastener disposed between said rear edge of said door and an adjacent portion of said trim structure releasably securing said rear edge of said door to said trim structure to prevent inadvertent opening of said door; and second and third releasable tear away fasteners disposed between said rear sections of said side edges of said door and adjacent portions of said trim structure and being absent from said front sections for releasably securing said rear sections only of said side edges to said trim structure, wherein said first fastener releases said door upon deployment of an air bag through said opening enabling said door to commence uninhibited outward separation from said trim structure along said rear portion of said side edges to partially open said deployment opening and allow the air bag to begin escapement through the partially opened deployment opening, and thereafter enabling continued separation of said door from said trim structure along said front portions of said side edges but with relatively increased resistance to separation provided by said second and third fasteners in relation to the separation of said rear portions to slow the further outward displacement of said door and assist in directing the air bag rearwardly into a passenger compartment of the vehicle.

9. A top-mount air bag cover door assembly for an automobile, said assembly comprising:

an automobile dashboard structure having a generally rectangular air bag deployment opening formed therein for the accommodation of a deployable air bag;

an air bag cover door disposed in said deployment opening having a generally rectangular shape complementing the shape of said deployment opening, said door having a front edge, a rear edge spaced from said front edge, and a pair of side edges extending transversely between said front and rear edges, each of said side edges having a front section adjacent said front edge of said door and corresponding rear section adjacent said rear edge of said door;

a hinge connection pivotally securing said front edge of said door to said dashboard structure;

a first releasable hook and loop tear away fastener disposed between said rear edge of said door and an adjacent portion of said dashboard structure releasably securing said rear edge of said door to said dashboard structure to prevent inadvertent opening of said door; and second and third releasable hook and loop tear away fasteners disposed between said rear sections of said side edges of said door and adjacent portions of said dashboard structure and being absent from said front sections of said side edges for releasably securing said rear sections only of said side edges to said dashboard structure, wherein said first fastener releases said door upon deployment of an air bag through said opening enabling said door to commence uninhibited outward separation from said dashboard structure along said rear portion of said side edges to partially open said deployment opening and allow the air bag to begin escapement through the partially opened deployment opening, and thereafter enabling continued separation of said door from said dashboard structure along said front portions of said side edges but with relatively increased resistance to separation provided by said second and third fasteners in relation to the separation of said rear portions to slow the further outward displacement of said door and to assist in deflecting the air bag rearwardly out of said deployment opening into a passenger compartment of the vehicle.

* * * * *